US008763828B2

(12) United States Patent
Dunn et al.

(10) Patent No.: US 8,763,828 B2
(45) Date of Patent: Jul. 1, 2014

(54) METHOD AND APPARATUS FOR REGULATING PRESSURE IN A CONTAINER

(71) Applicants: Steven Bryan Dunn, Beverly Hills, CA (US); Kevin Douglas Johnson, Tarzana, CA (US)

(72) Inventors: Steven Bryan Dunn, Beverly Hills, CA (US); Kevin Douglas Johnson, Tarzana, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 13/895,249

(22) Filed: May 15, 2013

(65) Prior Publication Data

US 2013/0306632 A1 Nov. 21, 2013

Related U.S. Application Data

(60) Provisional application No. 61/647,341, filed on May 15, 2012.

(51) Int. Cl.
*A61J 9/04* (2006.01)
*F16K 41/12* (2006.01)
*B65D 23/04* (2006.01)

(52) U.S. Cl.
CPC ............... *A61J 9/04* (2013.01); *B65D 2205/00* (2013.01); *B65D 23/04* (2013.01)
USPC ...................... 215/11.5; 220/203.19; 220/601

(58) Field of Classification Search
CPC ............... A61J 9/04; A61J 9/085; A61J 9/08; A61J 11/002; A61J 11/001; F16K 41/12; F16K 41/103; F16K 41/10; F16K 5/207; B65D 1/06; B65D 11/04; A47G 19/2255
USPC ............ 215/11.5, 11.4, 11.6, 11.1, 378, 370; 220/203.19, 203.11, 203.04, 203.01, 220/203.18, 203.16, 601; 251/335.3, 335.2
See application file for complete search history.

(56) References Cited

U.S. PATENT DOCUMENTS

| | | | | | |
|---|---|---|---|---|---|
| 307,630 | A * | 11/1884 | Clark | 215/378 |
| 362,554 | A * | 5/1887 | Suydam | 215/11.5 |
| 1,440,966 | A * | 1/1923 | Campus | 215/11.5 |
| 2,321,236 | A * | 6/1943 | Parkin | 137/860 |
| 2,597,483 | A * | 5/1952 | Head, Sr. | 137/533.29 |
| 2,960,088 | A * | 11/1960 | Witz | 215/11.4 |
| 2,987,209 | A * | 6/1961 | Leonard | 215/11.3 |
| 5,035,340 | A * | 7/1991 | Timmons | 215/11.4 |
| 5,474,028 | A * | 12/1995 | Larson et al. | 119/71 |
| 2004/0124168 | A1* | 7/2004 | Silver | 215/11.1 |
| 2005/0258123 | A1* | 11/2005 | Silver | 215/11.1 |

* cited by examiner

*Primary Examiner* — Robert J Hicks
(74) *Attorney, Agent, or Firm* — Robert Z. Evora, Esq.; Wade C. Yamazaki

(57) ABSTRACT

A method and apparatus for venting and compressing a fluid. The apparatus comprising a valve having a vent and a compressible element attached to the vent. The vent and the compressible element define a flow-through channel therein. The compressible element has an internal space adapted to be elastically compressed and expanded. The valve is further adapted to regulate a pressure in a container when a predetermined pressure is applied to the compressible element of the valve.

19 Claims, 8 Drawing Sheets

METHOD AND APPARATUS FOR REGULATING PRESSURE IN A CONTAINER

CROSS REFERENCE TO RELATED APPLICATION

This application claims priority to U.S. Provisional Patent Application Ser. No. 61/647,341, filed May 15, 2012; the contents of which are hereby incorporated by reference herein in their entirety into this disclosure.

TECHNICAL FIELD

The subject disclosure relates to a method and apparatus for regulating pressure in a container. More particularly, the present disclosure relates to a valve adapted to vent air and compress a fluid in a container to regulate the flow of the fluid from a container.

BACKGROUND

Starting a breastfeeding baby on a bottle is oftentimes difficult and may result of nipple confusion. It is commonly understood that there are fundamental differences between how a baby obtains milk from a bottle, and how a baby will get milk out of a breast. Because of these differences, a baby will try to use their familiar breast-feeding technique on the bottle and experience difficulty sucking from the bottle. Consequently, this lead to frustration by both the baby and the mother.

Mothers have tried various techniques in an attempt to get a baby to drink from a bottle, such as by trying to physically squeeze an internal bag within a bottle to get the milk to express into the baby's mouth. Various others have tried opening up the outlet hole in the nipple large enough so the fluid in the bottle will simply drain into the baby's mouth when it is tipped over. In both of these instances, the bottle is rendered useless as it is destroyed in its attempt to encourage the baby to drink from the bottle.

Despite the ineffectiveness of these conventional attempts, a need exists for an efficient container valve method and apparatus capable of both venting air and compressing a fluid in a container in order to induce the flow of a liquid from its outlet.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present invention will now be described in greater detail with reference to the figures.

Figure 1:
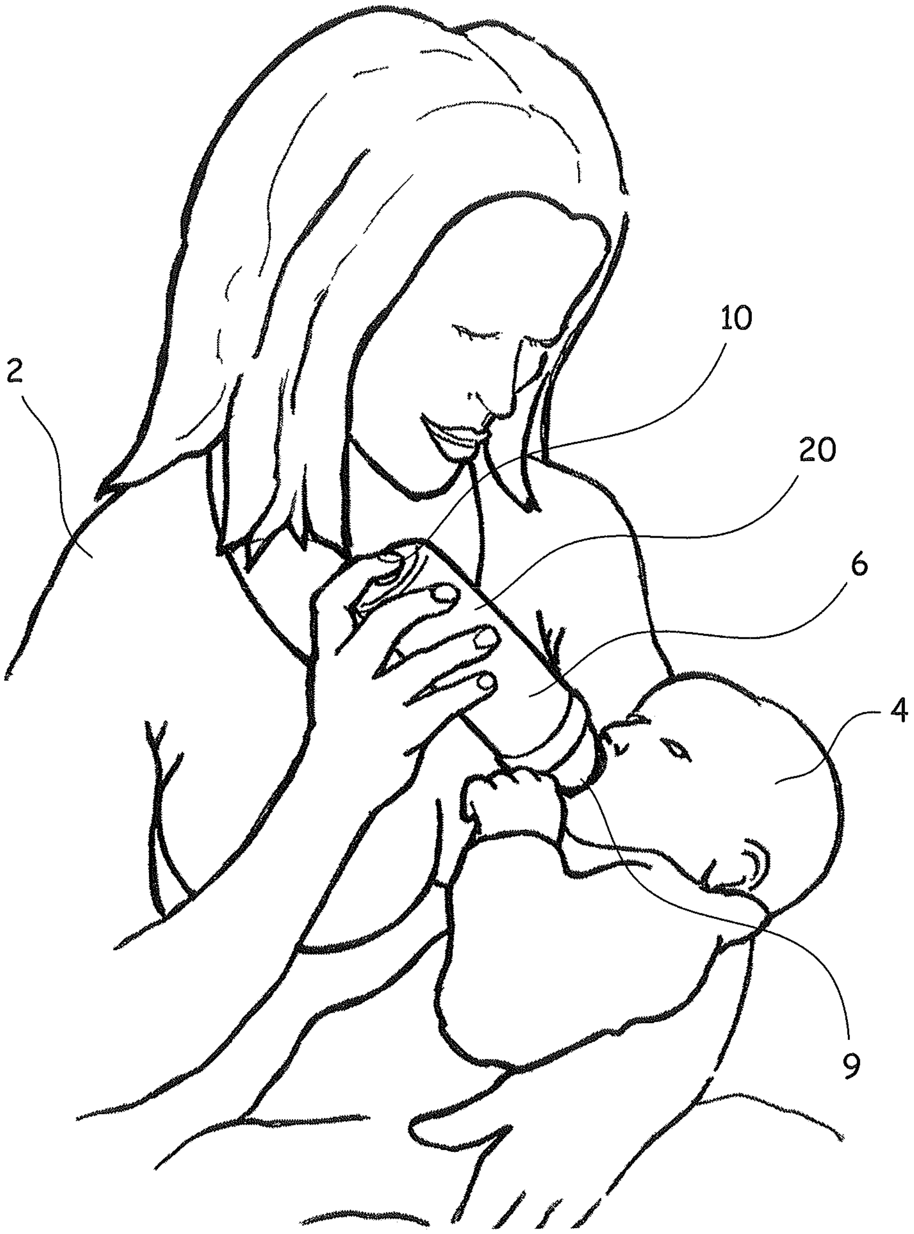
FIG. 1 illustrates an exemplary use for a container having a compressible valve capable of venting and throttling a pressure in a container according to the subject disclosure.
Figure 2:
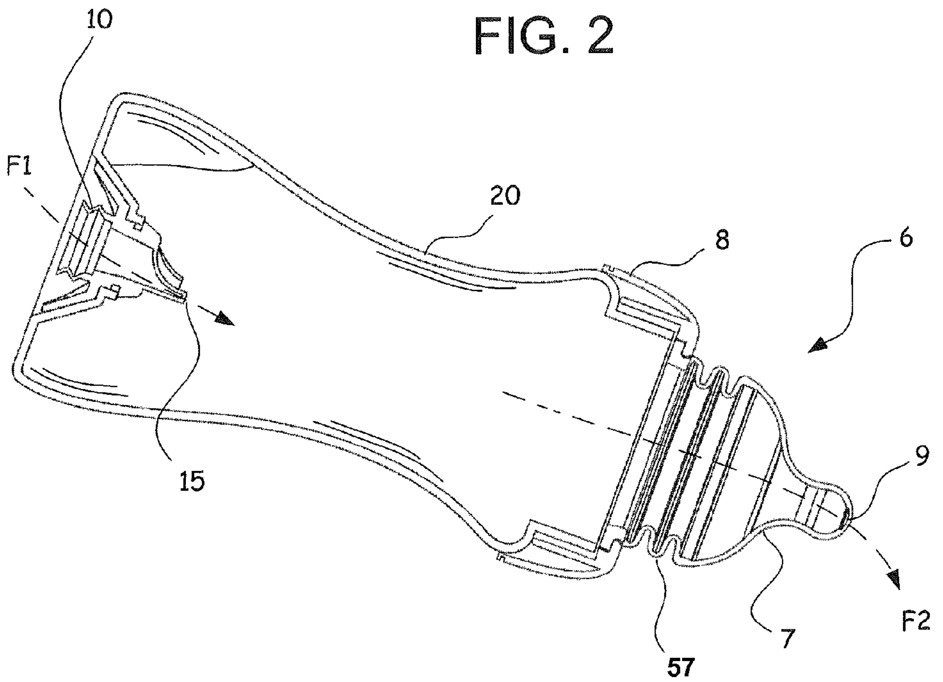
FIG. 2 depicts a cross-section view of the compressible valve disposed in the container.

FIG. 1 illustrates an exemplary use for a container 20 including an exemplary valve 10 according to this subject disclosure. The valve 10 is removable and adapted to allow air (as shown in FIG. 2, a first fluid F1) to vent into the container 20 when a vacuum is generated within the container 20. Furthermore, the valve 10 is constructed to allow a user to manually modify the rate of fluid flow (as shown in FIG. 2, a second fluid F2) out of the container 20 by compressing an elastic portion of the expandable valve 10 to build up a pressure in the valve 10 which is then transferred to the pressure in the container 20.

Although illustrated for use in a baby bottle 6 (as shown in FIGS. 1 and 2), it is to be understood that the valve 10 may be used for a variety of different containers and applications, such as for example: housewares: such as condiments, cleaning solutions, cooking ingredients; hardware: such as lubricants, stain removers, pesticides, lawn care; commercial applications: such as condiments in restaurants or the like, and/or any other contained product suitable for use with the removable compressible valve 10.

FIG. 1 demonstrates a caregiver 2 feeding an infant 4 from a container 20, such as a baby bottle 6 shown in FIG. 2 integrated with the exemplary removable valve 10. In operation, the removable valve 10 in the baby bottle 6 may be manually manipulated in order to regulate the flow rate of a first fluid (F1) into, and out of the valve 10. By manipulating the increase or decrease of the flow rate of a first fluid (F1) into the valve 10, the flow rate of a second fluid (F2) out of the container 20 is proportionately increased or decreased into the infant's mouth. That is, an air vent outlet 15 hole is provided in the valve 10 and may be selectively closed off at the inlet end 14 of the valve 10 to slow down the flow of the first fluid (F1). Alternatively, the inlet end 14 of the valve 10 may be manipulated to modify the rate of flow of the first fluid (F1) into the container 20, which in turn controls the rate of flow of the second fluid (F2) out of the container 20.

In FIG. 2, the exemplary container 20 is embodied as an infant bottle 6. The infant bottle 6 includes a nipple 7 fastened to the container 20 by a collar 8. The nipple 7 includes an outlet 9 from which the second fluid (F2) held in the container 20 will flow as the infant sucks from the nipple 7. As shown in this exemplary embodiment, the removable valve 10 is provided in the rear end of the container 20.

Figure 3:
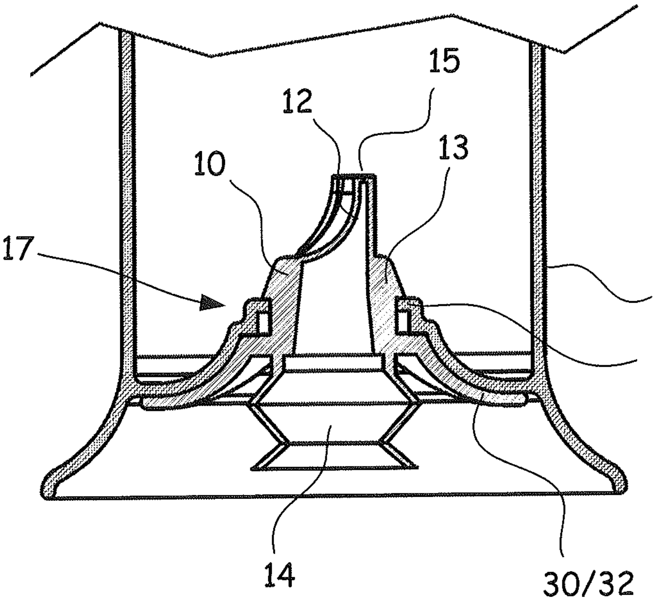
FIG. 3 shows the exemplary compressible valve disposed in a lower end of the container.
Figure 4:
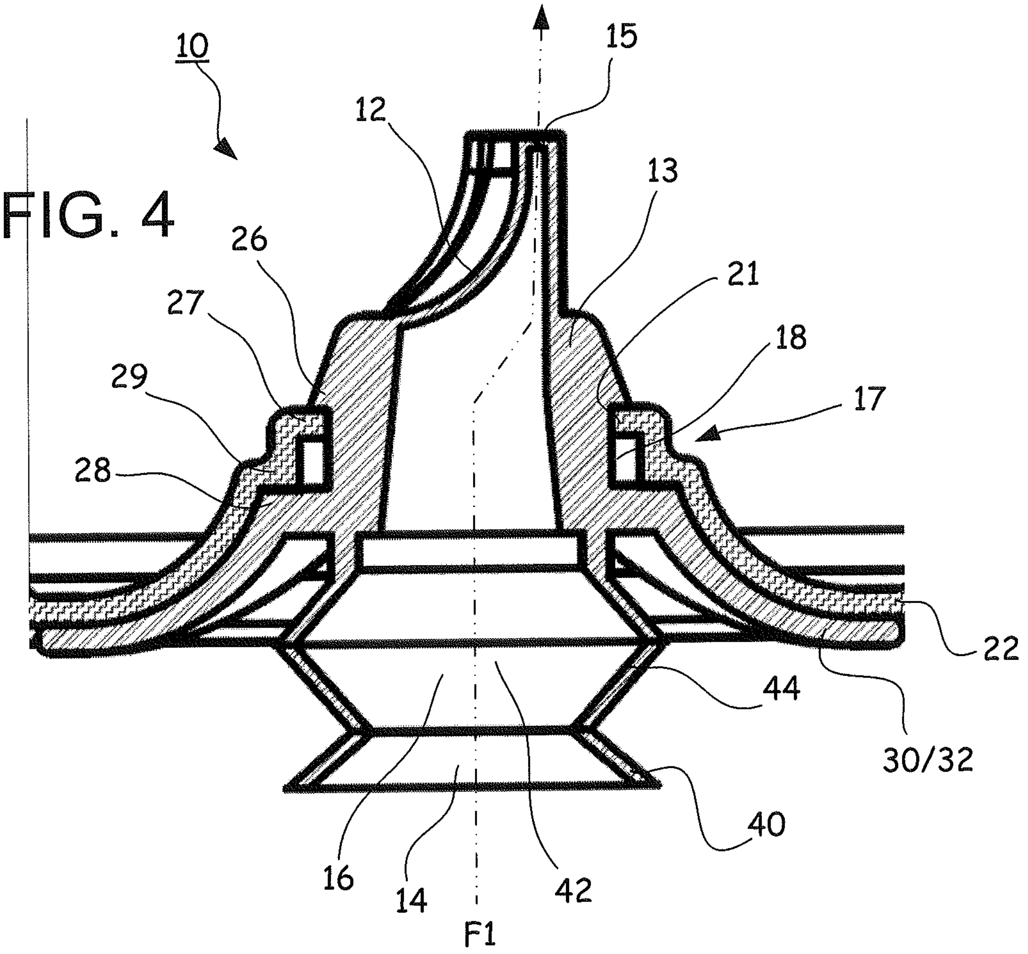
FIG. 4 depicts an enlarged view of the compressible valve.
Figure 5:
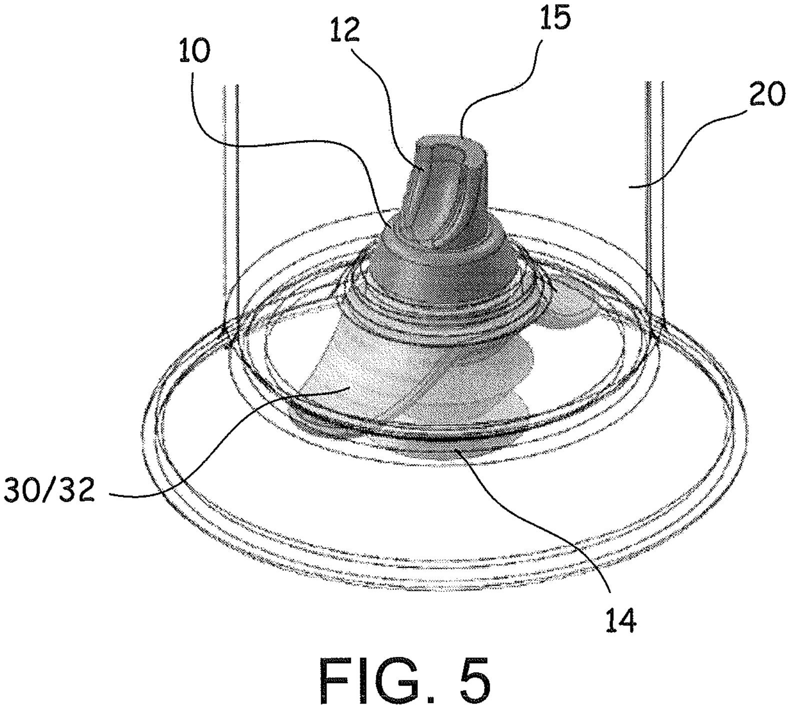
FIG. 5 illustrates a perspective view of the compressible valve disposed in the container.
Figure 6:
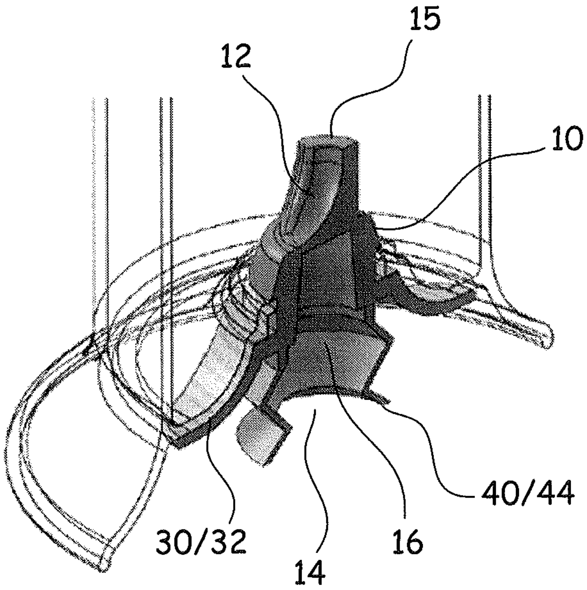
FIG. 6 depicts a perspective cross-section view of the compressible valve disposed in the container.

FIG. 3 illustrates a cross-section exploded view of the removable valve 10 disposed in the lower wall of a container 20. The valve 10 in composed of a body 13 having an inlet 14 and an outlet 15. Referring to FIGS. 3 and 4, an internal compressible volumetric space or internal channel 16 is provided in the valve 10 between the inlet 14 and the outlet 15.

The internal channel 16 fluidly connects the inlet 14 and the outlet 15 across the valve 10. The vent 12 and the compressible element 40 surround the internal channel 16. The size and shape of the internal channel 16 may take a variety of different shapes. As shown herein, the vent 12 is constructed of at least the outlet 15 end of the valve 10 that contains a single outlet hole and is constructed in the shape of a duck-bill valve. And, the inlet 14 end of the valve 10 is constructed as a compressible bellows 44.

The construction of the internal channel 16 may be selected based on a predetermined amount of fluid (F1) to be compressed, or restricted, through the valve 10, and a predetermined amount of fluid (F2) to be compressed, or restricted out of the container outlet 9. The valve outlet 15 of the valve 10 is the container inlet to the container 20. That is, the fluid (F1) flows from out of the valve outlet 15 and into the fluidly connected internal volume of the container 20 so that the valve outlet 15 is then the container inlet through which the fluid (F1) enters into the container 20 filled with another fluid (F2).

One or more inlet 14 and outlet 15 holes may be incorporated into the inlet 14 or outlet 15 of the removable valve 10 in accordance with the subject disclosure. Likewise, the inlet 14 and outlet 15 holes may take a variety of shapes and sizes.

The body 13 of the valve 10 is made up of a suitable material capable of sealing a fluid (F2) (such as a liquid) in the container 20 from a fluid (F1) (such as atmospheric air) outside of the container 10. The body 13 of the valve 10 may be constructed to include a sealing and securing mechanism 17 capable of fluidly sealing and fastening the body 13 of the valve 10 in a wall 22 of the container 20. As shown in FIG. 3, the wall 22 may be constructed to allow easy removal and cleaning of the valve 10 connected or separated from the container 20.

The sealing and securing mechanism 17 may be a contour in the shape of the body 13 that provides the securing and sealing feature. For example, the contour of the body 13 may include a recessed ridge 18. As shown in FIG. 4, the sealing and securing mechanism 17 comprises the recessed ridge 18 in the contour of the body 13 of the valve 10. A peripheral edge 21 of a wall 22 of the container 20 fits into the recessed ridge 18 and forms the fluid seal necessary to prevent fluid exchange inside and outside of the container 20 across the contact point made between the peripheral edge 21 of the wall 22 of the container 20 and the recessed ridge 18.

The sealing and securing mechanism 17 may include various other contours in the shape of the body 13, such as one, or various shoulders. As shown in FIG. 4, a first upper valve shoulder 26 may be constructed as part of the body 13 of the valve 10. The first upper valve shoulder 26 rests against a first upper wall shoulder 27. The surface contact between the first upper valve shoulder 26 and the first upper wall shoulder 27 is sufficient to prevent the exchange of fluid and form a seal there-between when contact is made between these component parts.

Also shown is a second lower valve shoulder 28 constructed as part of the body 13 of the valve 10. The second lower valve shoulder 28 rests against a second lower wall shoulder 29. The surface contact between the second lower valve shoulder 28 and the second lower wall shoulder 29 is sufficient to prevent the exchange of fluid and to form a seal there-between when contact is made between these component parts.

FIGS. 3-8 further depict the body 13 of the valve 10 including an extended flange 30. The extended flange 30 may take a variety of different sizes and shapes. At least two exemplary shapes are provided herein. According to a first embodiment shown in FIGS. 3-6 and 8, the flange 30 may be constructed in the shape of at least one or more arms or lobes 32.

Figure 7:
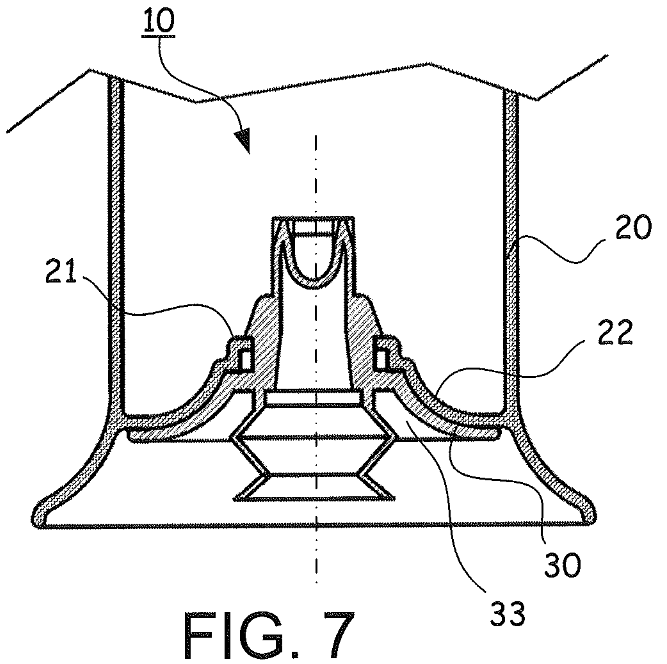
FIG. 7 illustrates a cross-section side view of the compressible valve having a concentric flange disposed in the container.

Alternatively, FIG. 7 depicts a second embodiment in which the flange 30 may be in the shape of a substantially concentric collar 33. The concentric collar 33 presses against the wall 22 of the container 20 to provide additional sealing contact resistance between the valve 10 and the wall 22 of the container 20. The concentric collar 33 provides a continuous seal about an axis of the valve 10.

The various flanges 30 may serve a variety of different purposes. For example, the flange 30 may operate to strengthen the fluid seal between the valve 10 and the wall 22 of the container 20. Alternatively, the flange 30 may function as a handle enabling the removable valve 10 to be easily pulled out of the container 20. Removal of the valve 10 is desired when the valve 10 is to be cleaned. The advantage of removing the valve 10 from the container 20 is the ability to thoroughly clean the valve 10 when it is separated from the container 20.

Referring back to FIG. 4, the body 13 of the valve 10 includes a compressible element 40. As shown in FIG. 4, the compressible element 40 is located adjacent to the inlet 14 of the valve 10 and takes the shape of a bellows 44 in this embodiment. The compressible element 40 is conveniently accessible for use by a user from outside of the container 20.

A volumetric space 42 bounded by the compressible element 40 is provided in the valve 10. The volumetric space 42 in the compressible element 40 may be manually reduced under compression inward, and restored to an outwardly expanded configuration when the compressible element 40 is released by a user. The action may be a deliberate manual compression and release movement performed by the user or caregiver. Although shown as a bellows 44, the compressible element 40 may take a variety of different shapes suitable for compressing the internal volumetric space 42 within the compressible element 40.

Figure 8:
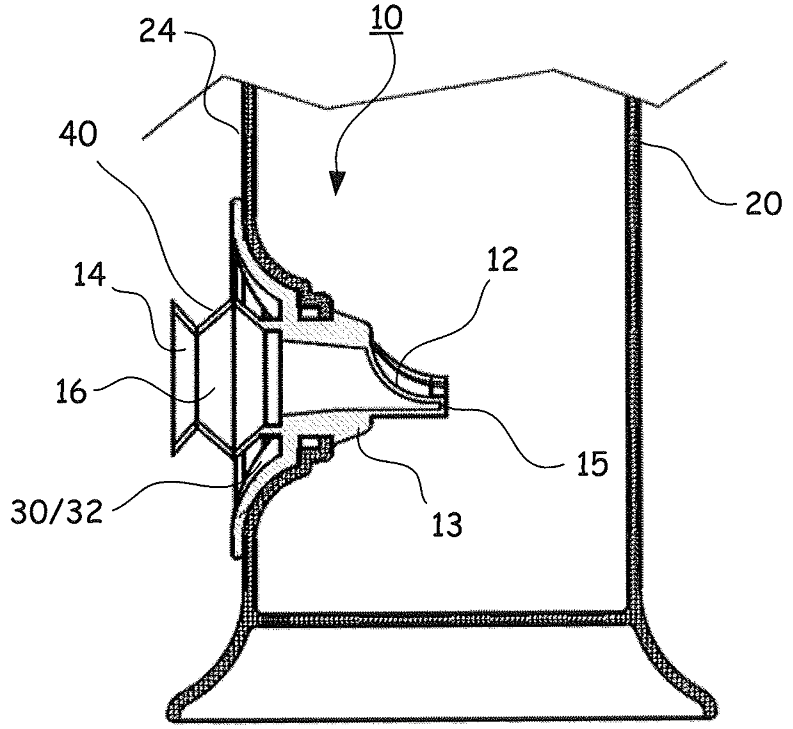
FIG. 8 illustrates a cross-section side view of the compressible valve disposed in a side wall of a container.

FIG. 8 illustrates another exemplary cross-section view of the removable valve 10 disposed in a position in a side wall 24 of the container 20. The valve 10 shown here includes a similar construction, features and functionality as described above. The valve 10 is also composed of a body 13 having an inlet 14 and an outlet 15. An internal channel 16 is disposed within the valve 10. The internal channel 16 is surrounded by the vent 12 and the compressible element 40. The internal channel 16 fluidly connects the inlet 14 and the outlet 15 across the valve 10. As mentioned previously, the size and shape of the internal channel 16 may take a variety of different constructions and may be selected based on a predetermined amount of fluid to be compressed through the valve 10, and out of the outlet 9 of the container 20.

According to this subject disclosure, it is to be understood that the valve 10 can take a variety of different constructions. The duck-bill valve construction shown can be substituted by various other suitable known valve configurations. Likewise, the compression element 40 can also take any other suitable shape and/or design in order to provide venting and compression of the volumetric area within the valve.

Figure 9:
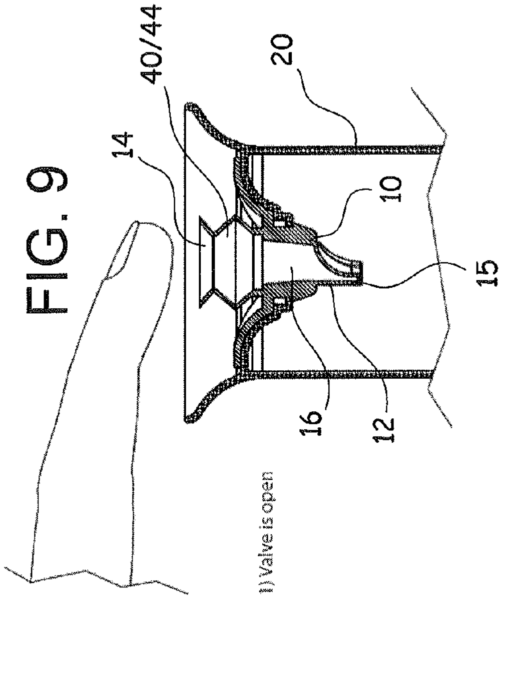
FIGS. 9-12 demonstrate an exemplary operation of the compressible valve disposed in the container.

FIGS. 9-12 illustrate the various operations of the valve 10. In FIG. 9, the valve 10 is shown open and uncompressed. In this position, the valve 10 operates as an air vent to permit a predetermined amount of a first fluid (F1), such as air to enter into the container 20 through the vent 12 under a vacuum as the fluid from within the container 20 is drawn out form an opposite end. Entry of the atmospheric air drawn into the valve 10 occurs when a vacuum is built up inside of the container 20. The vacuum draws air from the surrounding atmosphere disposed outside of the container 20. In the case where the container 20 is a baby bottle, being able to automatically regulate the vacuum built up in the container 20 across the vent 12 has various advantages to a nursing infant.

Figure 10:
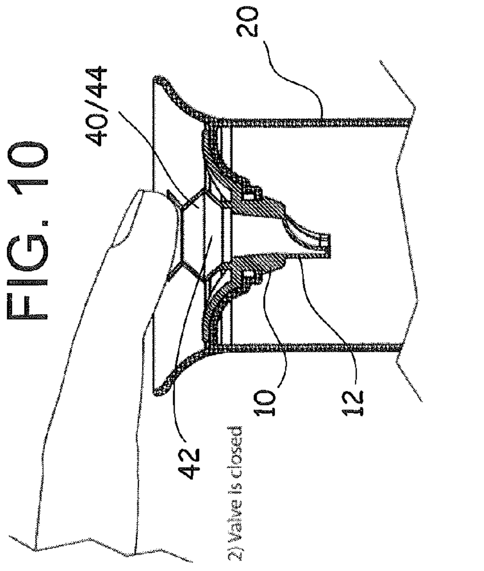

As shown in FIG. 10, a compressible element 40 of the valve is accessible from outside of the container 20. In use, a tip of a finger is placed over the inlet 14 end of the compressible element 40 in order to close off the vent 12 of the valve 10. In this position, the finger blocks off the inlet 14 so that atmospheric air may not enter through the fluid channel 16 into the container 20. The user may manipulate the flow of fluid out of the vent 12 of the container 20 by selectively blocking the inlet 14 to the valve 10. By blocking the inlet 14 opening 14, as the fluid is drawn through the outlet 9 and out of the container 20, a vacuum is created in the container 20 as a result of the displacement of the fluid in the container 20 since atmospheric air is not allowed to enter through the valve 10 and into the container 20 to restore the displacement. As the vacuum increases in the container 20, the continuous drawing of the fluid from inside of the container 20 becomes more difficult to suck out of the container 20 because of the build-up of the negative pressure vacuum inside of the container 20. According to the subject disclosure, the caregiver can selectively manipulate the flow of fluid coming out of the container 20 by intermittently blocking, compressing and unblocking the inlet 14 of the valve 10.

Figure 11:
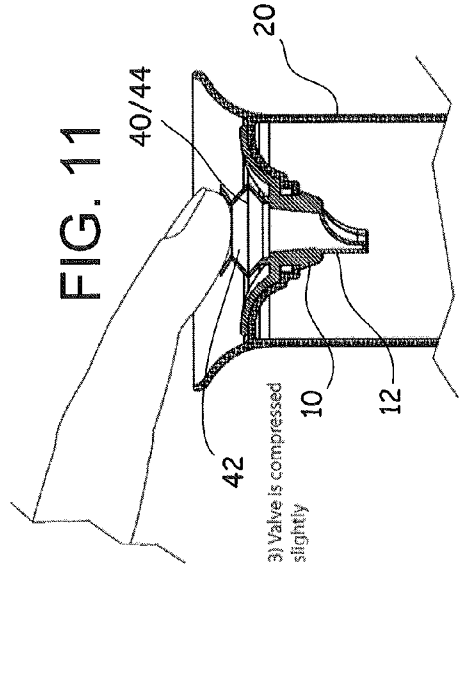

In FIG. 11, the tip of the finger is slightly compressed against the compressible element 40, such as the bellows 44. When the bellows 44 is compressed, the volumetric space 42 is also compressed and caused to be decreased in size, creating an increase in pressure in the volumetric space 42 and in the fluidly connected container 20. This increase in pressure in the fluid (F1) is manually created by the caregiver 2. The increase in pressure in the fluid (F1) is then translated through the vent 12 in the valve 10 into the container 20 and causes the fluid (F2) inside of the container 20 to be pushed out of the container outlet 9 at a higher rate of fluid flow. In the instance where the container 20 is a baby bottle 21 (such as shown in FIGS. 1 and 2), a baby feeding from the bottle 6 will experience an increase in fluid (F2) flowing out of the bottle 6 from inside of the container 20, through the outlet 9 and into the mouth of the infant 4 when the bellows 44 of the valve 10 is compressed.

Figure 12:
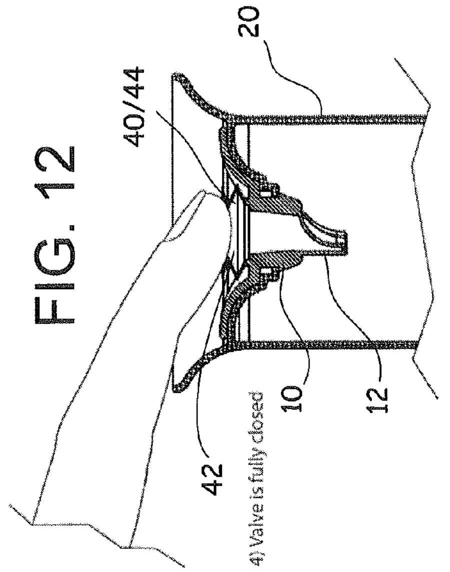

In FIG. 12, the tip of the finger is further compressed against the bellows 44. As shown, the bellows 44 is sufficiently compressed so that the volumetric space 42 bound by the bellows 44 is nearly flattened out and non-existent. The compression of the bellows 44 further creates an increase in pressure in the reduced volume of the volumetric space 42, which is then translated through the vent 12 to the container 20. This progressive increase in pressure created by the manual depression action by the caregiver 2 causes the fluid (F2) inside of the container 20 to be pushed out of the container outlet 9 at an even higher fluid flow rate than that shown in FIG. 11 with slight compression applied.

The infant 4 feeding from the bottle 6 will experience an elevated increase in fluid pushed from inside of the container 20 through the outlet 9 into the mouth of the infant 4. As the caregiver repeatedly pumps the compressible element 40, the elevated level of fluid provided into the mouth of the infant 4 through the outlet 9 can be manually regulated. That is, the caregiver can increase, decrease and/or regulate the flow of fluid through the outlet 9 exit in the container 20 by throttling the compressible valve 10 disposed in the container 20.

An exemplary method for regulating the pressure in a container via manipulation of a valve may be performed according to this subject disclosure. Providing a removable valve for venting a first fluid into a container. The valve is capable of providing a compression pressure to a second fluid in the container.

The valve includes a vent and a compressible body attached to the vent. The vent and the compressible body of the valve define a flow-through channel disposed therein. The compressible body has an internal space adapted to be resiliently compressed and expanded. The valve may be positioned in a variety of suitable locations on the container, such as for example, at a bottom end, a side wall of the container, and/or any other suitable location in accordance with this subject disclosure.

In operation, the valve is adapted to regulate a pressure in the container. Regulation of the valve occurs in a variety of different ways as explained in more detail below.

Venting of the container with atmospheric air (a first fluid) occurs when the valve is open and uncompressed. A predetermined quantity of air is permitted to enter into a container through a one-way valve under the draw of a vacuum. That is, as the fluid is withdrawn from the container through its outlet, the vacuum within the container is created and entry of the air through the vent in the valve occurs.

Regulating the vacuum can also be performed by a user selectively blocking off an inlet of the valve so that atmospheric air may not enter through the channel into the container. By blocking the inlet opening, a vacuum is created in the container. As the vacuum increases, the continuous draw of the fluid from inside of the container becomes more difficult to release from inside of the container. In this way, manipulation of the flow of fluid coming out of the container can be performed by throttling the flow of fluid across the valve, such as by intermittently blocking, compressing and unblocking the inlet of the valve.

Increasing the pressure in the container occurs when a compressible element, such as a bellows portion disposed in the valve is compressed. A volumetric space bound by the compressible element and the body of the valve is decreased. As such, the pressure is increased in the volumetric space of the valve. Since the volumetric space is fluidly connected to an internal volume in the container, the pressure in the container is also proportionately increased. This increase in pressure can cause the fluid inside of the container to be pushed out of the container outlet at an increased rate of flow.

The rate of flow may be manually manipulated as desired by a user. That is, the pressure can be slight or substantially elevated depending on the amount of compression and/or throttling applied to the compressible element of the valve. In one instance, for example, when the valve is used with a bottle container, the valve may be used to provide a priming action to the bottle container to slightly build up the pressure therein. When the outlet of the container, such as a nipple, is sucked on by an infant, the flow of fluid will respond rapidly because the internal pressure will be substantially heightened to a level that is just under its spill pressure. This elevated pressure will assist in encouraging an infant to feed from the nipple of the bottle. Under the increased pressure, the actuation of the container outlet will respond immediately as soon as the infant begins to suck on the outlet of the nipple, thereby inducing the flow of a fluid from the container.

Figure 13:
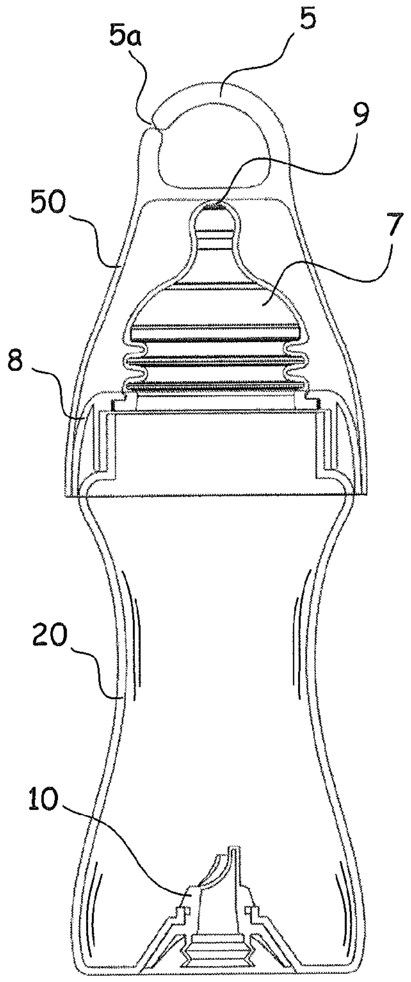
FIG. 13 depicts a compressible valve disposed in a container having a releasable cover.
Figure 14:
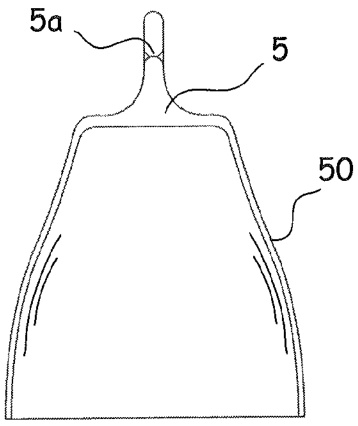
FIGS. 14-16 illustrate a side view, front view and rear view respectively, of the releasable cover.
Figure 15:
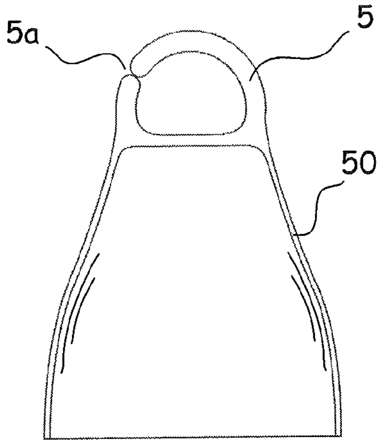
Figure 16:
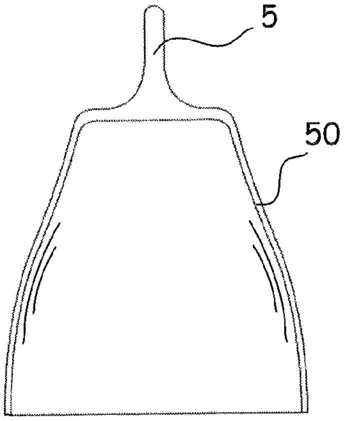

FIGS. 13-16 show the container 20 including a cover 50. FIGS. 14-16 show a left side view, a front view and a right side view of the cover 50 respectively. The cover 50 is adapted to be releasably secured over the container 20. More specifically, the cover 50 is secured over the nipple 7 to protect the nipple 7 from contamination.

The cover 50 may be attached to the container 20 in a variety of different ways. For example, the cover 50 may be secured by a friction fit to the container 20 over the collar 8 such that an internal diameter of the cover 50 is slightly smaller than the outer diameter of the collar 8. When the cover 50 is placed over the collar 8 and pressed thereon, a friction fit is formed between the two components. It is to be understood, that the cover 50 may be attached to various other components of the container 20.

As shown in FIG. 13, the cover 50 includes a fastener 5 provided to attach the cover 50 of the infant bottle 6 to another object. The fastener 5 shown includes a looped attachment including an opening 5*a* to allow the fastener 5 to be opened and secured to the other object. The fastener 5 may take a variety of different forms, including but not limited to, a hook, a belt loop, a strap and buckle, Velcro® attachment, a zipper and/or any other type of suitable fastener in accordance with the subject disclosure.

Figure 17:
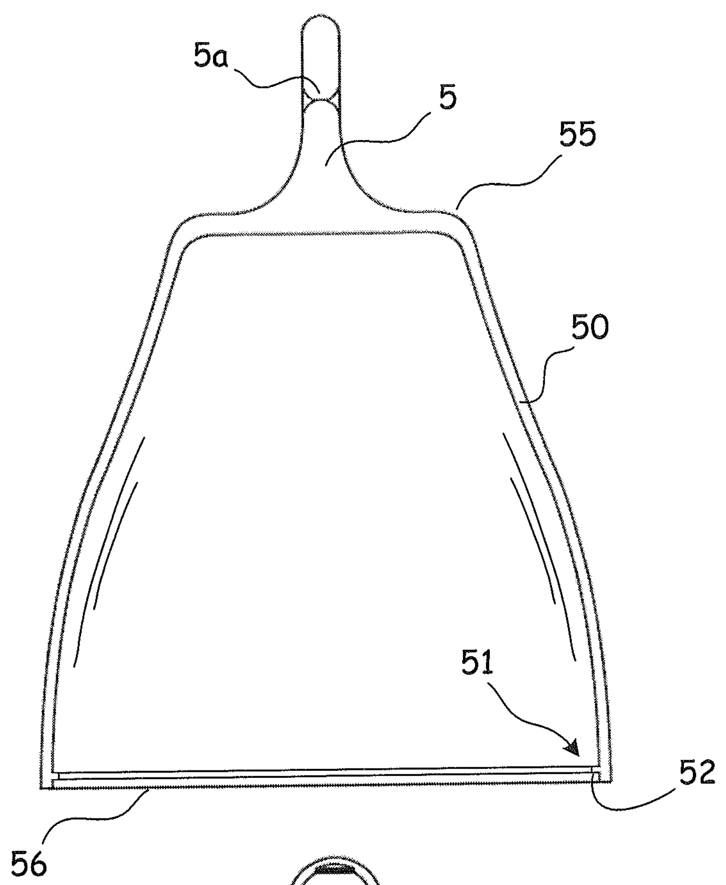
FIG. 17 shows an enlarged view of the releasable cover and an attachment mechanism therefore.
Figure 18:
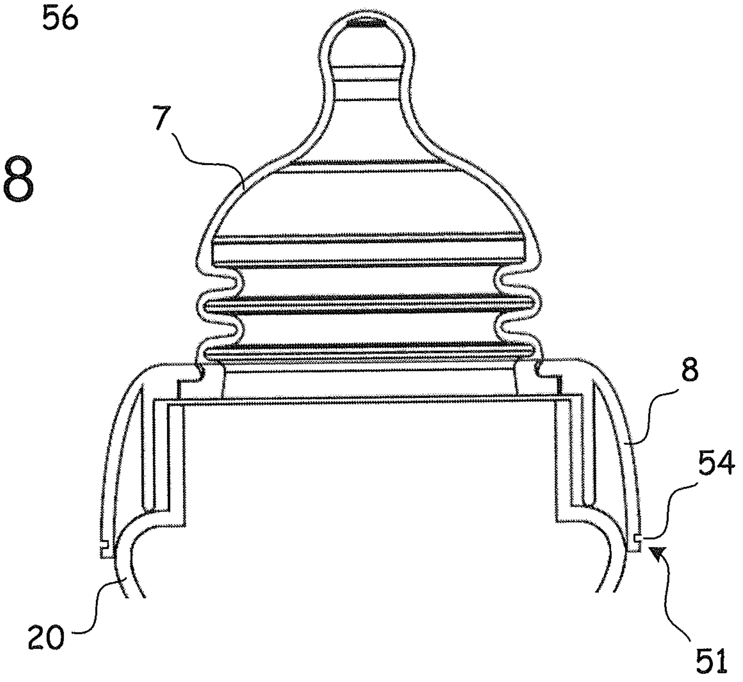
FIG. 18 depicts an enlarged view of a collar adapted to receive the releasable cover and an attachment mechanism therefore.

FIGS. 17 and 18 illustrate an enlarged view of the releasable cover 50 and an exemplary attachment mechanism 31 having complimentary parts disposed on the cover 50 and on the collar 8 respectively. In more detail in FIG. 17, the cover 50 includes a closed end 55 and an open end 56. A first portion of the complimentary attachment mechanism 51 includes a projecting ledge 52. The projecting ledge 52 is disposed adjacent to the open end 56 of the cover 50.

FIG. 18 illustrates the second portion of the complimentary attachment mechanism 51 disposed on the collar 8. The second portion of the complimentary attachment mechanism 51 including a detent 54 recess adapted to matingly receive the projecting ledge 52.

When the cover 50 is attached to the collar 8 as shown in FIG. 13 and in more detail in FIGS. 17-18, the projecting ledge 52 is aligned with and secured to the detent 54. The connection made between the projecting ledge 52 and the detent 54 is strong enough to overcome normal jostling of the container 20 filled with a fluid and attached to an object. For example, in the case of a baby bottle 6, when the fastener 5 is attached to a stroller, diaper bag, belt loop or the like, normal movement such as walking with the stroller would not cause the cover 50 to be disengaged from the collar 8.

Although the attachment mechanism 51 is shown as a projecting ledge 52 and detent 54, it is to be understood that the attachment mechanism 51 can be any mechanism capable of fastening the cover 50 to the collar 8. For example and not limited to, the attachment mechanism 51 can be embodied as: a threaded fastener; a snap lock connection and/or any other type of attachment mechanism in accordance with the subject disclosure. Likewise, although the cover 50 is shown engaged with the collar 8, it is to be understood that the cover 50 may make a suitable secured connection with any other component on the baby bottle 6 such as the body of the container 20.

Furthermore, and as shown in FIG. 2, the removable valve 10 may be used in combination with an expandable nipple 7. The expandable nipple 20 may be an accordion style nipple having at least one pleat or fold 57 disposed in the neck of the expandable nipple 7. In combination with the valve 10, the expandable nipple 7 can provide various functions. That is, the expandable nipple 7 is capable of increasing the volumetric area within the container 20 under a predetermined pressure. Since the expandable nipple 7 may be made of a resilient material, the nipple 7 is biased to rest in a compressed configuration such as shown in FIG. 2.

The expandable nipple 7 is adapted to flexibly bend sideways from an axial direction of the nipple extension that is also substantially aligned with an axis of the container 20. The advantage of being able to bend the expandable nipple 20 can best be understood when a nursing child and/or animal that is sucking from the end of the expandable nipple 7 tilts their head out of alignment with the axis of the expandable nipple. As a result of the flexible bending neck in the nipple 7, the latch on to the nipple will remain intact as the tip of the expandable nipple 7 is able to flexibly bend out of the axial alignment with movement of the head of the nursing child and/or animal.

It is to be understood that the size, shape, orientation of the valve, its component parts, valve passages and various other features may be modified in accordance with the subject disclosure to efficiently modulate the fluid flow rate through the valves and its various components parts.

Various materials may be used according to this disclosure including, but not limited to: polypropylene, a thermoplastic elastomer, a high density polyethylene, polycarbonate, urethane rubber, silicone and/or any other suitable material may be used.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A removable valve for venting and compressing a fluid, comprising:

a body having an inlet and an outlet with a fluid channel disposed there between, wherein a fluid communicates from outside of a container and the outlet of the value communicates the fluid into the container, the body having a flange extending from the body of the valve, the flange being urged against a wall of the container to provide a seal between the valve and the wall of the container;

a compressible element having an internal space adapted to elastically compress and expand, the compressible element accessible for use from outside of the container; and a vent attached to the compressible element.

2. The valve recited in claim 1, wherein the valve regulates a pressure in the container when a predetermined pressure is applied to the compressible element of the valve.

3. The valve recited in claim 1, wherein the flow of the fluid into, and out of the valve is controlled by manipulation of the compression element.

4. The valve recited in claim 3, wherein the compression element is a bellows adapted to elastically compress and expand a volume of the internal space.

5. The valve recited in claim 1, wherein the outlet in the valve includes at least one outlet hole.

6. The valve recited in claim 1, wherein the vent of the valve is a duck-bill configuration.

7. The valve recited in claim 1, wherein the body further comprises a securing element having a recessed ridge in the contour of the body into which a peripheral edge of a wall is disposed and forms a fluid seal to prevent an exchange of fluid there between.

8. The valve recited in claim 2, wherein the body of the valve includes a securing element capable of fastening and fluidly sealing the body of the valve in a wall of the container.

9. The valve recited in claim 7, wherein the securing element further comprises at least one valve shoulder and a wall shoulder in the container that matingly engage each other to secure the valve and form a seal.

10. The valve recited in claim 1, wherein the flange may be constructed as a lobe or a concentric collar.

11. A compressible valve for venting and increasing pressure, comprising:

a body having an inlet and an outlet with a fluid channel disposed there-between, and a flange extending from the body of the valve, the flange being urged against a wall of a container to provide a seal between the valve and the wall of the container;

a vent; and a compressible element having an internal space disposed within the fluid channel adapted to elastically compress and expand, the compressible element accessible for use from outside of the container and the compressible element being attached to the vent.

12. The compressible valve recited in claim 11, wherein the body of the valve includes a recessed ridge in the contour of the body into which a peripheral edge of a wall is disposed and forms a fluid seal to prevent an exchange of fluid there between.

13. The removable valve recited in claim 11, wherein a flow of a first fluid (F1) into, and out of, the valve is controlled by manipulation of the compression element.

14. A removable valve for venting and throttling pressure in a container, comprising:

a container having an inlet and an outlet, wherein a fluid communicates from outside of the container and the outlet of the valve communicates the fluid into the container;

a flange extending from the removable valve, the flange being urged against a wall of the container to provide a seal between the valve and the wall of the container, a vent disposed in the inlet of the container;

a compressible element attached to the vent, the compressible element having another inlet into an internal space adapted to elastically compress and expand, the compressible element accessible for use from outside of the container; and a fluid channel provided in the removable valve.

15. The removable valve recited in claim 14, wherein a flow of the fluid into, and out of, the valve is controlled by manipulation of the compression element.

16. The removable valve recited in claim 14, wherein the valve may be selectively closed off to slow down, or modify, the rate of a flow of the fluid into the container, which in turn controls the rate of flow of a second fluid out of the container.

17. The removable valve recited in claim 14, wherein the container is an infant bottle.

18. The removable valve recited in claim 14, wherein the valve is disposed in at least one of a rear wall or a side wall of the container.

19. The removable valve recited in claim 14, wherein a cover having an attachment mechanism is adapted to be releasably secured over the container.

* * * * *